March 17, 1942.                P. S. RUSSEL                2,277,006
                              CONTROL DEVICE
                         Original Filed Nov. 23, 1937
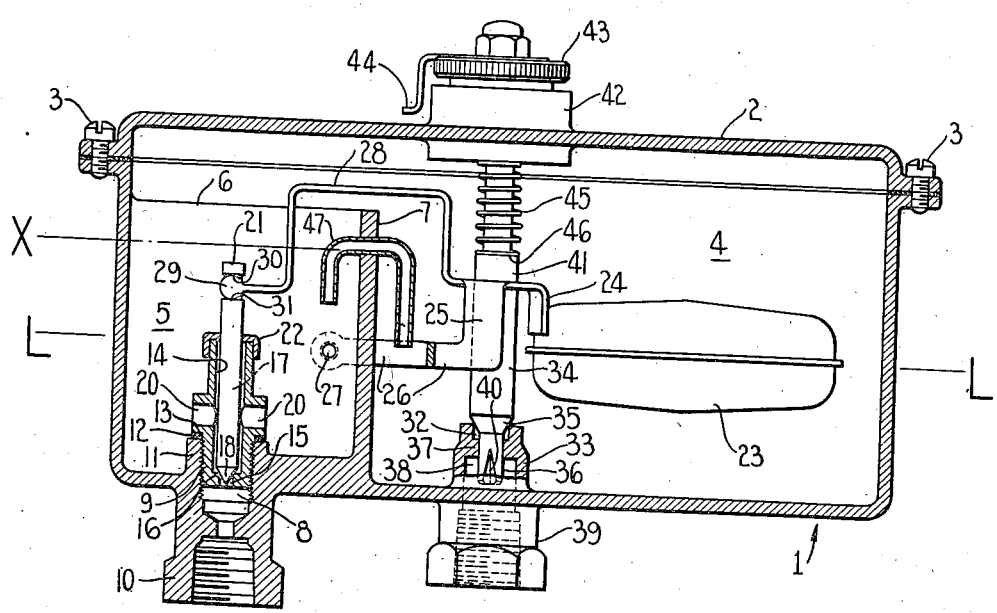
INVENTOR
Philip S. Russel
BY
Andrew K. Foulds
his Attorney Patented Mar. 17, 1942

2,277,006

UNITED STATES PATENT OFFICE 2,277,006

CONTROL DEVICE

Philip S. Russel, Detroit, Mich., assignor to Detroit Lubricator Company, Detroit, Mich., a corporation of Michigan Original application November 23, 1937, Serial No. 176,145, now Patent No. 2,230,911, dated February 4, 1941. Divided and this application August 2, 1940, Serial No. 349,997

3 Claims. (Cl. 137—68)

My invention relates generally to control devices and more particularly to gravity feed, constant liquid level controls.

It is an object of my invention to provide a new and improved liquid level control device in which clogging of a port by foreign matter is prevented.

Another object of my invention is to provide a new and improved liquid level control device in which a valve, controlling a port to maintain a constant liquid level in a chamber, is operated in a manner to automatically keep the port free of clogging material.

Another object of my invention is to provide, in a device of the above mentioned character, new and improved valve actuating mechanism which will, at regular intervals, close the valve with a snap action, and which will operate in this manner and yet maintain a substantially constant liquid level or pressure head in a chamber.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

The figure of the drawing is a view in vertical central cross section of a form of my control device showing certain of the parts thereof in elevation.

Referring to the drawing by characters of reference, the numeral 1 designates in general a hollow casing that may include a removable top wall or cover 2 which may be held in place by screws 3 or by other suitable means. The casing 1 has a relatively large outlet chamber 4 for liquid and a relatively small inlet chamber 5. The inlet chamber 5 may be located at one end of the casing 1 within the outlet chamber 4, and may be rectangular in shape as in the present instance. The inlet chamber 5 is substantially rectangular and may be formed by vertical walls 6 and 7, together with a portion of the side and bottom walls of the casing 1. Preferably the walls 6, only one of which is shown, and which may be termed the side walls of the inlet chamber 5, extend longitudinally of the casing 1 in spaced, parallel relation with each other and join with the casing side and bottom walls. Preferably the wall 7 which may be termed the end wall of the inlet chamber 5, extends transverse to and joins with the side walls 6 and the bottom wall of casing 1. The walls 6 and 7 may terminate below the casing cover 2, and the upper end of the inlet chamber 5 is open, as shown.

The chamber 5 has an inlet passageway 8, preferably through the bottom wall of the casing 1, and screw-threaded into the inlet passageway 8 there is preferably provided a removable valve seat member or fitting 9 that projects upwardly within the inlet chamber 5. The bottom wall of the casing 1 may be formed with a depending hollow boss 10, communicating with the inlet passageway 8, for connection with a conduit or pipe (not shown) that may connect the inlet to a source of supply of liquid. The inlet passageway 8 preferably extends through an upstanding boss 11 formed integral of the casing bottom wall, and a gasket 12 may be held under compression between the upper end of the boss 11 and an external annular flange 13 of the fitting 9 to insure a fluid-tight joint. The fitting 9 may be a tubular shaped, open-ended member having a vertically extending passageway or bore 14 that may have a reduced bore portion 15, preferably at the lower end of the fitting 9, to provide an upwardly facing port and seat 16 for cooperation with a valve member 17. The valve member 17 is disposed for vertical reciprocal movement in the fitting bore 14, and at its lower end the valve member is preferably formed with a conical face 18 for cooperation with the port 16 to control flow therethrough. The vertical bore 14 of the fitting 9 is of slightly larger diameter than the diameter of the valve member 17 to provide an annular space or chamber for flow of liquid, and opening through the side wall of the fitting 9, within the chamber 5, one or more apertures or bores 20 may be provided for the passage of liquid out of the fitting into the inlet chamber 5. The valve member 17 has a stem portion 21 which projects upwardly above the upper end of the fitting 9, and fitted over the upper end of the fitting 9 a cap 22 may be provided having an aperture therethrough for slidably receiving and guiding the valve member 17.

A float 23 is disposed in the outlet chamber 4 and is operatively connected to the valve member 17 by a lever member, designated in general by the numeral 24. Intermediate its ends the lever member 24 may have downturned side flanges 25 out of which may be formed a pair of spaced lever arms 26. The lever arms 26 may straddle or position one on each side of the inlet chamber side walls 6 and have aligning apertures for receiving pins 27 that may be secured in and to the walls 6 for pivotally supporting the lever 24. The lever member 24 may be rigidly secured at one end thereof to the float 23, and the other end of the lever member 24 extends into the inlet chamber 5 for connection with the valve member 17. Intermediate its ends the lever member 24 may have an upwardly directed, offset or bent portion 28 to extend upward over the top of wall 7 and down into the chamber 5 and terminating in an end portion 29. The lever member end portion 29 is preferably rounded, as shown, and is received between a pair of spaced shoulders 30, 31 of the valve member stem portion 21 so that as the lever member 24 is pivoted about its fulcrum pins 27 by the float 23 the valve member 17 may be vertically moved relative to the seat 16 with little or no side thrust. It is also to be understood that the valve member and lever member may be operatively connected in any other suitable manner.

The constant level chamber 4 has an outlet port 32 which is preferably formed by the upper open end of a hollow boss 33 that may be integral with the bottom wall of the casing 1 and may project slightly upward within the chamber 4. The upper end of the hollow boss 33 is also provided with a seat for a manually operable valve member 34 that is preferably provided to regulate the rate of flow of liquid from chamber 4. The valve member 34 may have a beveled or conical shaped face 35 for engaging its seat to close the port 32. Below the conical face 35, the valve member 34 preferably has a lower end portion of reduced diameter, as at 36, that is slidably received and guided in an aperture or bore provided through an internal, transversely extending wall 37 of the boss 33, the wall 37 preferably being located adjacent the upper end of the boss 33. Below the transverse wall 37, the boss 33 has a passageway 38 that leads downward through the bottom wall of the casing 1, through an external hollow boss 39 which may be threaded for connection to a supply line or conduit (not shown). The valve member 34 preferably has a metering slot 40 in the side wall of the reduced valve member portion 36, and the metering slot 40 may extend longitudinally of the valve member 34. At its upper end, the metering slot 40 preferably terminates at a point such that the entire slot will be below the upper surface of the transverse wall 37 when the valve member 34 is seated, as shown. When the valve member 34 is raised from its seat such that a small portion of the metering slot 40 is above the upper surface of the transverse wall 37, fuel will flow from the chamber 4 through port 32, metering slot 40 into the outlet passageway 38, and the rate of flow of liquid will be governed, or will depend upon how much of the area of the metering slot 40 is above the transverse wall 37.

The valve member 34 preferably has a stem portion 41 that extends substantially vertically, and an upper end portion thereof preferably projects externally of the casing 1 through the top wall or cover 2. Any suitable mechanism, such for example as a cam and cam follower (not shown), may be provided to obtain gradual rectilinear movement of the valve member 34 to change the rate of flow of liquid, and this mechanism may be enclosed in a housing 42 in the form of a hollow boss that may surround the valve stem portion 41 and be integral with the casing cover 2. An upper end portion of the valve stem portion 41 projects above the housing 42 and secured thereto there may be provided a knob 43 for conveniently rotating the valve member 34. Carried by the knob 43 there may be provided a pointer 44 for cooperation with indicia that may be provided on the casing cover to aid in positioning the valve member 34 to obtain a desired rate of flow of liquid from the chamber 4. Surrounding the valve member 34 within chamber 4 there is preferably provided a helical coil spring 45 having one end abutting an upwardly facing shoulder 46 formed on the valve member 34 and the other end abutting the underside of the housing or boss 42. The spring 45 is under compression acting to move the valve member 34 downwardly or toward closed position.

The chambers 4 and 5 are in communication with each other through a siphon tube 47 having its shorter leg within chamber 5 and its longer leg within chamber 4. The tube 47 has its cross-sectional flow area greater than the effective maximum flow area through outlet port 32. The inlet port or passageway 16 is of a size such that when the valve member 17 is in an open position, the rate of inflow to the interior of the casing 1 will be greater than the rate of outflow through outlet port 32 when the valve member 34 is in wide open position. Furthermore, it is desirable that open position of the valve member 17 be had with a relatively small decrease in liquid level in chamber 4 below the line L—L.

The device operates to cyclically open and close the valve member 17 as follows: When the chamber 4 is empty, or the liquid level therein is below the desired, predetermined, substantially constant level, the float 23 will be in a down position below that shown in the figure so that the valve member 17 will be raised from its seat to permit liquid to flow into chamber 5 through passageway 8. The liquid entering the chamber 5 will cause the level therein to rise and when the level therein rises to the level of the line X, liquid will start to overflow through the siphon tube 47 into the chamber 4. Subsequent increase in liquid level in chamber 5 will cause a relatively rapid liquid flow through the tube 47 so that the liquid flow will sweep any air in the tube 47 into the chamber 4 to start the siphonic action of the tube 47. The bore of the tube 47 should be such that the air will easily be swept or purged out to prevent an air lock. For this purpose a tube of from $\frac{1}{16}$ inch to $\frac{3}{16}$ inch, inside diameter, was found satisfactory for normal flows encountered in normal installations. The liquid level in chamber 5 will then be rapidly lowered until the liquid level goes below the end of the short leg of tube 47. As the liquid flows into chamber 4, the liquid level therein will be raised and the float 23 will be lifted and will, through its lever member 24, start movement of the valve member 17 toward closed position. However, this movement will not affect the rate of flow through passageway 8 until the liquid level in chamber 4 has risen substantially to the desired liquid level at the line L—L. Upon the liquid level rising to the line L—L, the valve member 17 will be moved to closed position. It may be that a single discharge from the chamber 5 will be insufficient to raise the level in chamber 4 to the line L—L, if the level in chamber 4 is still below the level L—L the siphonic action will again be repeated until the level L—L in chamber 4 is reached. Normally, however, the level L—L will be reached with one siphonic action. As the valve member 17 approaches its seat, the rate of inflow of liquid to chamber 5 will be less than the rate of flow through siphon tube 47 and the liquid level in chamber 5 will decrease until the flow through the tube 47 ceases due, as above described, to the level of the liquid in chamber 5 falling below the end of the short leg of tube 47 and breaking the siphonic action. Normally upon closure of the valve member 17, the siphon tube 47 will function to continue the discharge of liquid from chamber 5 into chamber 4, but by reason of the relatively greater size of chamber 4 the volume of liquid siphoned out of chamber 5 will cause only a slight rise of liquid level above the line L—L in chamber 4. This increase of liquid level in chamber 4 will be insufficient to cause any material variation in the liquid head on the outlet port 32, and the rate of flow through outlet port 32 will therefore remain substantially constant irrespective of this slight change in liquid level. Obviously the maximum rise may be regulated by changing the length of the short leg of tube 47 and/or the relative size of the chambers 4 and 5. The actual amount of liquid discharged from chamber 5 to chamber 4 may vary each time depending upon the level in chamber 5 when the level L—L in chamber 4 is attained. When the liquid level in chamber 4 drops below the line L—L for any reason, such as consumption of the oil or liquid supplied by or from chamber 4, the float member 23 will start to open the valve member 17, but as the liquid in chamber 5 has been lowered to or below the lower end of the shorter leg of the siphon tube 47, no liquid will be fed into the chamber 4. Therefore the valve member 17 will be moved toward open position in accordance with the decrease of liquid level in chamber 4, and the operation above described by which the liquid is siphoned from chamber 5 into chamber 4 will be repeated. The lever mechanism interconnecting the valve member 17 and the float member 23, as was stated hereinbefore, is so constructed that full opening of valve member 17 will be effected by a very slight decrease of liquid level in chamber 4 below the line L—L so that the inflow of liquid through port 16 is quickly brought to a flow greater than that through outlet port 32 to maintain the change of liquid level between a desired minimum and maximum in chamber 4. This arrangement of the connection between the float 23 and valve member 17 permits the difference between minimum and maximum to be maintained as small as possible and insufficient to deleteriously affect the flow from the outlet port 32 during supply of liquid in normal operation, which flow may, for all commercial usage, be considered constant for any setting of the valve member 34. By the novel feeding of liquid to the chamber 4, the valve member 17 is not held in a throttled position but is cyclically moved to allow rapid flow of liquid through inlet passageway 8 to prevent clogging of the port 16.

Should the syphon tube 47 become inoperative for any reason and fail to empty the chamber 5, as in the normal operation hereinbefore set forth, the liquid level in the chamber 5 will rise and liquid will flow over the walls 6 and 7 into the chamber 4. While such an operation will not include the cycling feature hereinbefore described, the control apparatus will continue to operate in a usable manner. The valve member 17 will in such an event act to modulate or throttle the incoming liquid into the casing 1 in accordance with the rate of outflow through port 32 in a manner similar to that of the prior art.

This application is a division of my copending application, Serial No. 176,145, filed November 23, 1937, for Control devices, now Patent No. 2,230,911 granted Feb. 4, 1941.

What I claim and desire to secure by Letters Patent of the United States is:

1. In a constant liquid level control device, a casing having two chambers, one of said chambers having a small liquid surface area relative to the other of said chambers, an inlet passageway opening into said one chamber, an outlet passageway opening from said other chamber, means to siphon liquid from said one chamber into said other chamber, a float member in said other chamber responsive to liquid level therein and operable to maintain a substantially constant liquid level therein, a valve member in said one chamber and controlling said inlet passageway, and means operatively connecting said float member to said valve member, said one chamber liquid area being so related to said other chamber liquid area that one siphonic action will not materially affect the liquid level in said other chamber.

2. In a constant liquid level control device, a casing, wall means separating said casing internally into a first chamber having a relatively small liquid surface area and a second chamber having a relatively large liquid surface area, said casing having an inlet passageway opening into said first chamber, said casing having an outlet passageway opening from said second chamber, gravity means having a flow capacity greater than the flow capacity of said outlet passageway and operable to transfer liquid from said first chamber into said second chamber, a float member in said second chamber responsive to liquid level therein and operable to maintain a substantially constant liquid level therein, a valve member in said first chamber and controlling said inlet passageway, and means operatively connecting said float member to said valve member, said first chamber having its liquid receiving capacity so related to the liquid receiving capacity of said second chamber that the liquid admitted to said second chamber by said gravity means in any one operation is ineffective to materially change the liquid level in said second chamber.

3. In a constant liquid level control device, a chambered casing having a relatively small chamber with a relatively small liquid surface area and a relatively large chamber with a relatively large liquid surface area, said casing having an inlet passageway opening into said small chamber, said casing having an outlet passageway leading from said large chamber, a U-shaped siphon means having a short leg and a long leg, said short leg being in said small chamber and said long leg being in said large chamber, said siphon means being operable to transfer liquid from said small to said large chamber at a greater rate than the liquid can flow through said outlet passageway, said small chamber having a liquid receiving capacity relative to the liquid receiving capacity of said large chamber such that the liquid admitted to said large chamber by said siphon means at any one operation is ineffective to materially affect the liquid level in said large chamber, a second means for flow of liquid area from said small to said large chamber upon failure of said siphon means, and means for controlling flow of liquid through said inlet passageway and operable to maintain a substantially constant liquid level in said large chamber.

PHILIP S. RUSSEL,